United States Patent
Bradley et al.

(10) Patent No.: US 7,945,510 B1
(45) Date of Patent: May 17, 2011

(54) SYSTEMS AND METHODS FOR PROVIDING A MORTGAGE WITH A SLIDING CREDIT LINE

(75) Inventors: Michael G. Bradley, Chesterfield, MO (US); J. Douglas Gordon, Arlington, VA (US); Walter C. Muren, Frederick, MD (US)

(73) Assignee: Federal Home Loan Mortgage Corp. (Freddie Mac), McLean, VA (US)

( * ) Notice: Subject to any disclaimer, the term of this patent is extended or adjusted under 35 U.S.C. 154(b) by 1743 days.

(21) Appl. No.: 10/387,325

(22) Filed: Mar. 13, 2003

Related U.S. Application Data (60) Provisional application No. 60/399,442, filed on Jul. 31, 2002.

(51) Int. Cl.
*G06Q 40/00* (2006.01)
(52) U.S. Cl. .......... 705/38; 705/35; 705/36; 705/37; 705/27
(58) Field of Classification Search .......... 705/35–38, 705/27
See application file for complete search history.

(56) References Cited

U.S. PATENT DOCUMENTS

| | | | | |
|---|---|---|---|---|
| 5,940,812 | A * | 8/1999 | Tengel et al. | 705/38 |
| 5,966,700 | A | 10/1999 | Gould et al. | 705/38 |
| 6,070,151 | A | 5/2000 | Frankel | 705/35 |
| 6,088,686 | A * | 7/2000 | Walker et al. | 705/38 |
| 6,345,262 | B1 | 2/2002 | Madden | 705/38 |
| 6,901,384 | B2 * | 5/2005 | Lynch et al. | 705/38 |
| 7,324,970 | B2 * | 1/2008 | Magruder et al. | 705/38 |
| 2002/0035520 | A1 * | 3/2002 | Weiss | 705/27 |

OTHER PUBLICATIONS

Sinnock, Bonnie "Salomon back on top", National Mortgage News, New York; Apr. 14, 1997. vol. 21, Iss. 28; p. 1, 2 pgs.*
Eatman et al. (Exhibit "Q" Contingent Interest Loans: Two Mortgages Are Better Than One By: Louis P. Eatman and Alec G. Nedelman Copyright 1990).*
Hybrid Equity Product Offered by Security's Seattle Unit; Ellen Braitman, American Banker (pre-1997 Fulltext), New York, NY., Jan. 25, 1991.*
Hybrid Equity Product Offered by Security's Seattle Unit; Ellen Braitman, American Banker (pre-1997 Fulltext), New York, NY., Jan. 25, 1991.*
"Low money down" Michelle C Hamecs, William S Renner. Housing Economics. Washington: Mar 1999. vol. 47, Iss. 3; p. 10, 4 pgs.*

(Continued)

*Primary Examiner* — Harish T. Dass
(74) *Attorney, Agent, or Firm* — Finnegan, Henderson, Farabow, Garrett & Dunner, LLP (57) ABSTRACT

Systems and methods consistent with the present invention provide a mortgage with a primary credit line and a sliding credit line, such that the borrower may request to borrow from the sliding credit line as part of the original mortgage. A level of risk associated with the borrower may be determined based on credit information of the borrower; a first credit line may be established based on the determined level of risk associated with the borrower, the first credit line being set as a debt of the mortgage; a second credit line may be established based on the determined level of risk associated with the borrower, the second credit line being set as a maximum to which the debt of the mortgage may be increased during the mortgage; and the mortgage may be offered to the borrower with the established first and second credit lines, such that a single first lien may serve as security for the first and second credit lines. Moreover, a mortgage lender may record the single first lien as the sum of the primary and sliding credit lines.

21 Claims, 7 Drawing Sheets

OTHER PUBLICATIONS

Ayres et al., "Why Not? It Beats a CD," Forbes, p. 160 (Dec. 8, 2003).
Baldwin et al., "Mortgage-Backed Securities: A Reference Guide for Lenders & Issuers," Probus Publishing Company, Chicago, IL (1990).
Financial Real Estate Handbook, Citicorp Mortgage, CMI Division Training, Publication No. 412, Financial Publishing Company, Boston, MA (Aug. 1986).
Simon, Ruth, "Banks Make Home-Equity Pitch Ahead of Mortgage Boom's Bust," Wall Street Journal, Jan. 29, 2003.
Harney, Kenneth, "Home Asset Management Accounts Link Mortgages, Equity Lines," Washington Post, Oct. 5, 2002.
Office Action mailed Aug. 6, 2008 in U.S. Appl. No. 11/967,615.
Office Action mailed Feb. 5, 2009 in U.S. Appl. No. 11/967,615.
Office Action mailed Aug. 6, 2008 in U.S. Appl. No. 11/967,676.
Office Action mailed Feb. 5, 2009 in U.S. Appl. No. 11/967,676.
Office Action mailed Jun. 10, 2009 in U.S. Appl. No. 11/967,615.
Office Action mailed Jun. 8, 2009 in U.S. Appl. No. 11/967,676.

* cited by examiner

SYSTEMS AND METHODS FOR PROVIDING A MORTGAGE WITH A SLIDING CREDIT LINE

CROSS REFERENCE TO RELATED APPLICATION

This application claims the benefit of U.S. Provisional Patent Application No. 60/399,442, entitled "SYSTEMS AND METHODS FOR PROVIDING A MORTGAGE WITH A SLIDING CREDIT LINE," filed on Jul. 31, 2002, the disclosure of which is expressly incorporated herein by reference in its entirety.

BACKGROUND OF THE INVENTION

I. Field of the Invention

The present invention generally relates to financial systems and to systems and methods for processing financial information. More particularly, the invention relates to systems and methods for providing a home mortgage with an established credit line for the borrower.

II. Background and Material Information

When a lender provides a home mortgage loan to a borrower, the terms of the mortgage take into account various factors. The factors determine, in part, what interest rate the borrower will qualify for and even whether the mortgage loan is approved. One of these factors is the risk associated with nonpayment by the borrower. The risk of nonpayment represents the likelihood that the borrower will fail to make timely mortgage payments and possibly default on the mortgage loan—an outcome that the lender prefers to avoid. As such, when the risk of nonpayment is high, the lender may take one or more actions including (1) rejecting the mortgage application, (2) approving the mortgage application at a lower principal amount, (3) approving the mortgage application at a higher interest rate when compared to a borrower with a lower likelihood of nonpayment, and/or (4) requiring the borrower to make a larger down payment. In essence, the mortgage terms and conditions attempt to account for the risk of nonpayment.

Generally, a lender gathers information about the borrower's credit history, income, assets, and liabilities to assess the borrower's ability to repay the mortgage. With the information, the lender determines the risk of nonpayment associated with the borrower's mortgage. However, once the borrower receives the mortgage, the borrower may take additional loans against any equity in the mortgaged property. Indeed, even at the closing of a mortgage, a borrower may take a second mortgage on the property from a different lender. For example, the borrower may use funds from a second mortgage to supplement the down payment required to close the first (or original) mortgage on the property in cases where the first mortgage loan cannot exceed 80% of the value of the property. Similarly, the borrower may take a home equity line of credit (HELOC) against any equity in the mortgaged property. In both cases, the borrower has less of his own assets at stake when he defaults on the mortgage loan because the borrower has increased the debt and reduced equity in the property. Accordingly, second mortgages and HELOCs significantly increase the risk of mortgage nonpayment, which is a risk the lender seeks to avoid. More troubling, the first mortgage lender may be unaware of the second mortgage and HELOC and thus be unaware of the increased risk of mortgage nonpayment.

When a lender sells a mortgage to an investor, the investor of the mortgage makes a purchase decision based on the perceived risk associated with the mortgage. For example, an investor expects a higher rate of return when purchasing one or more mortgages with a higher likelihood of nonpayment when compared to mortgages that are unlikely to default. The same can be said for an investor in mortgage-backed securities: the investor expects a higher rate of return when investing in securities with a higher likelihood of nonpayment. However, the investor may be completely unaware of the second mortgage and HELOC and the associated increased risk of mortgage nonpayment.

SUMMARY OF THE INVENTION

Accordingly, the present invention is directed to systems and methods for processing financial information. More particularly, the present invention is directed to systems and methods for providing a mortgage, wherein the mortgage includes a primary credit line (which serves as an initial loan) and a sliding credit line, such that a borrower may request to borrow against the sliding credit line as part of the mortgage. Moreover, both the primary and sliding credit lines may be established at the creation of the mortgage and may be a first lien on the mortgaged property.

A financial system consistent with the systems and methods of the present invention determine a level of risk associated with the borrower based on credit information of the borrower; establish a first credit line based on the determined level of risk associated with the borrower, the first credit line being set as a debt of the mortgage; establish a second credit line based on the determined level of risk associated with the borrower, the second credit line being set as a maximum to which the debt of the mortgage may be increased during the mortgage; and offers the mortgage to the borrower with the established first and second credit lines, such that a single first lien may serve as security for the first and second credit lines.

Additional features and advantages of the invention will be set forth in part in the description that follows and in part will be obvious from the description, or may be learned by practice of the invention. The objectives and advantages of the invention may be realized and attained by the system and method particularly described in the written description and claims hereof as well as the appended drawings.

To achieve these and other advantages and in accordance with the purpose of the invention, as embodied and broadly described herein, methods consistent with the present invention also increase a debt amount associated with a mortgage secured by a single first lien that secures a first credit line and a second credit line. Furthermore, the method may include, for example, receiving a request for credit from the sliding credit line, such that the sliding credit line represents a maximum to which the debt amount of the mortgage may be increased during the mortgage; determining a level of risk associated with a borrower of the mortgage based on credit information of the borrower; and increasing the debt amount by the request for credit based on the determined level of risk.

Moreover, in one embodiment consistent with the present invention, there is provided a method of issuing securities backed by one or more mortgages, wherein at least one of the one or more mortgages is secured by a single first lien on a first credit line and a second credit line. The method includes, for example, issuing securities backed by a first debt based on the first credit line; determining whether the borrower has borrowed a second debt from the second credit line; and issuing additional securities backed by the second debt.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Systems and methods consistent with the present invention permit a lender to provide a mortgage, wherein the mortgage includes both a primary credit line and a sliding credit line. The primary credit line serves as an initial loan amount provided to the borrower. The sliding credit line, on the other hand, may be invoked by the borrower during the term of the mortgage. Moreover, the sliding credit line may be capable of adjustment over the term of the mortgage as the value of the mortgage property changes, i.e., as the mortgaged property increases in value, the sliding credit line may increase. Because the lender provides a single mortgage that includes two pieces (the primary and sliding credit lines), the lender may record a single first lien for both pieces of the mortgage—securing thus both pieces with the single first lien. In addition, since the sliding credit line is part of the first lien, the borrower does not need to acquire a separate mortgage to use the sliding credit line.

In one embodiment, a lender may receive a borrower's mortgage application and then determine a level of risk associated with the borrower based on the borrower's mortgage application including the borrower's credit information predictive and information about the asset itself. The level of risk enables the lender to establish a primary credit line and a sliding credit line from which the borrower may request additional credit. The sliding credit line may be established as a maximum amount that limits the total amount of debt the borrower can request. Furthermore, when the mortgage is created, the sliding credit line may include conditions under which the borrower may request and receive credit from the sliding credit line.

For example, the borrower may seek to purchase a home valued at $100,000 and request a mortgage of $80,000. After analyzing the borrower's loan application (and credit information and other publicly available information concerning the borrower, the home, etc.), the lender may for example establish for the borrower a mortgage with a primary credit line of $80,000 and a sliding credit line of $20,000. The lender may record a first lien on the property of $100,000 (the total of the primary and sliding credit lines). But unlike the $80,000, which is simply provided at mortgage closing, the sliding credit line includes conditions under which the borrower can access the sliding credit line. In one embodiment, the conditions may define (or require) one or more of the following: a satisfactory credit history, a maximum loan-to-value ratio on the borrower's existing home (i.e., the already mortgaged premises), an applicable interest rate (e.g., prime plus 2%), how often the sliding credit line may be accessed, how it may be accessed, when the sliding credit line may be accessed, a requirement that a reappraisal of the property be provided, and a reassessment of the borrower's credit.

Because the borrower's mortgage payment represents only the principal and interest payments on the amounts actually borrowed the lender increases the principal owed, which is the debt, on the mortgage by the amount borrowed under the sliding credit line. For example, the lender may initially compute a mortgage payment for the borrower that represents the primary credit line. Then, when the borrower accesses the sliding credit line, the lender may then recompute the monthly payment amount based on the principal and interest due on the primary credit line and on the principal and interest due on the sliding credit line. The borrower then pays this recomputed monthly payment for the term of the mortgage unless the borrower once again draws additional credit from the remaining credit in the sliding credit line. Since any amounts borrowed from the sliding credit line are secured under a single first lien, the lender does not need to record additional liens. Moreover, amounts borrowed under the sliding credit line are secured by a first lien with priority over any other lower priority liens, such as a second lien securing a home equity loan.

For example, the lender may initially compute a mortgage based on the initial loan (or debt) from the primary credit line, e.g., $80,000. In this example, if the borrower draws $10,000 (from the sliding credit line with an available balance of $20,000), the lender recomputes the monthly payment amount owed by the borrower based on $80,000 at x % interest rate (i.e., the principal and interest due on the primary credit line) and on $10,000 at y % interest rate (i.e., the principal and interest due on the sliding credit line). The borrower then pays the new (or recomputed) mortgage payment. In addition, the borrower may later access the $10,000 remaining in the sliding credit line. In one embodiment, the lender may automatically offer any funds in the sliding credit line and/or increase or decrease the sliding credit line amount.

By using the sliding credit line, the lender is more aware of the total debt associated with the mortgaged property. The lender is also more aware of the corresponding risk of nonpayment associated with the property. Furthermore, when the lender sells (or securitizes) the mortgage or when mortgage-backed securities are sold, the mortgages (or securities) more accurately represent the corresponding risk of nonpayment associated with the mortgages. Accordingly, the buyer of the mortgage (or security) is also more aware of the corresponding risk of nonpayment.

Figure 1:
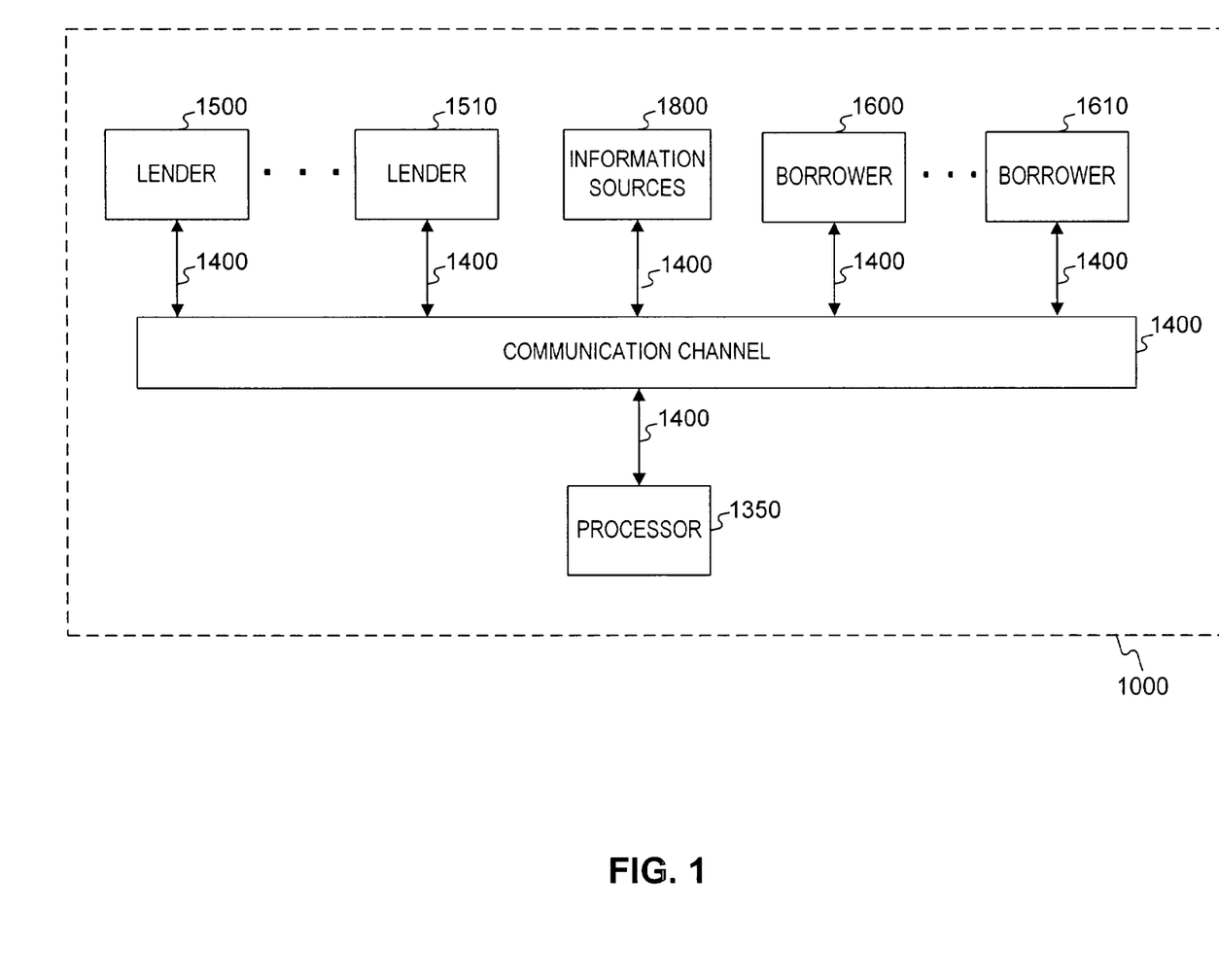
FIG. 1 illustrates an exemplary system environment in accordance with systems and methods consistent with the present invention.

FIG. 1 shows an exemplary system 1000 for providing a mortgage with a sliding credit line. In one embodiment, the sliding credit line is established at the creation (e.g., closing) of the mortgage, such that the borrower may request to borrow against the sliding credit line as part of the original mortgage.

Referring to FIG. 1, the system 1000 includes a communication channel 1400, one or more lenders 1500,1510, one or more borrowers 1600, 1610, information sources 1800, and a processor 1350. The lenders 1500, 1510 may include a bank, mortgage bank, mortgage broker, mortgage originator, and any other financial entity. The borrowers 1600, 1610 may include an entity, such as a consumer, seeking a mortgage. The processor 1350 may include an entity capable of processing the mortgage with the sliding credit line, for example, the lender, a broker, a servicer, and any other financial entity. The information sources 1800 may include one or more of the following: a source of mortgage application information, a source of credit information for one or more borrowers (e.g., credit bureau information and/or credit scores), loan (or mortgage) payment history, and property appraisal information.

Although the communication channel 1400 is depicted in FIG. 1 as bi-directional, a skilled artisan would recognize that unidirectional communication links may be used instead.

Figure 2:
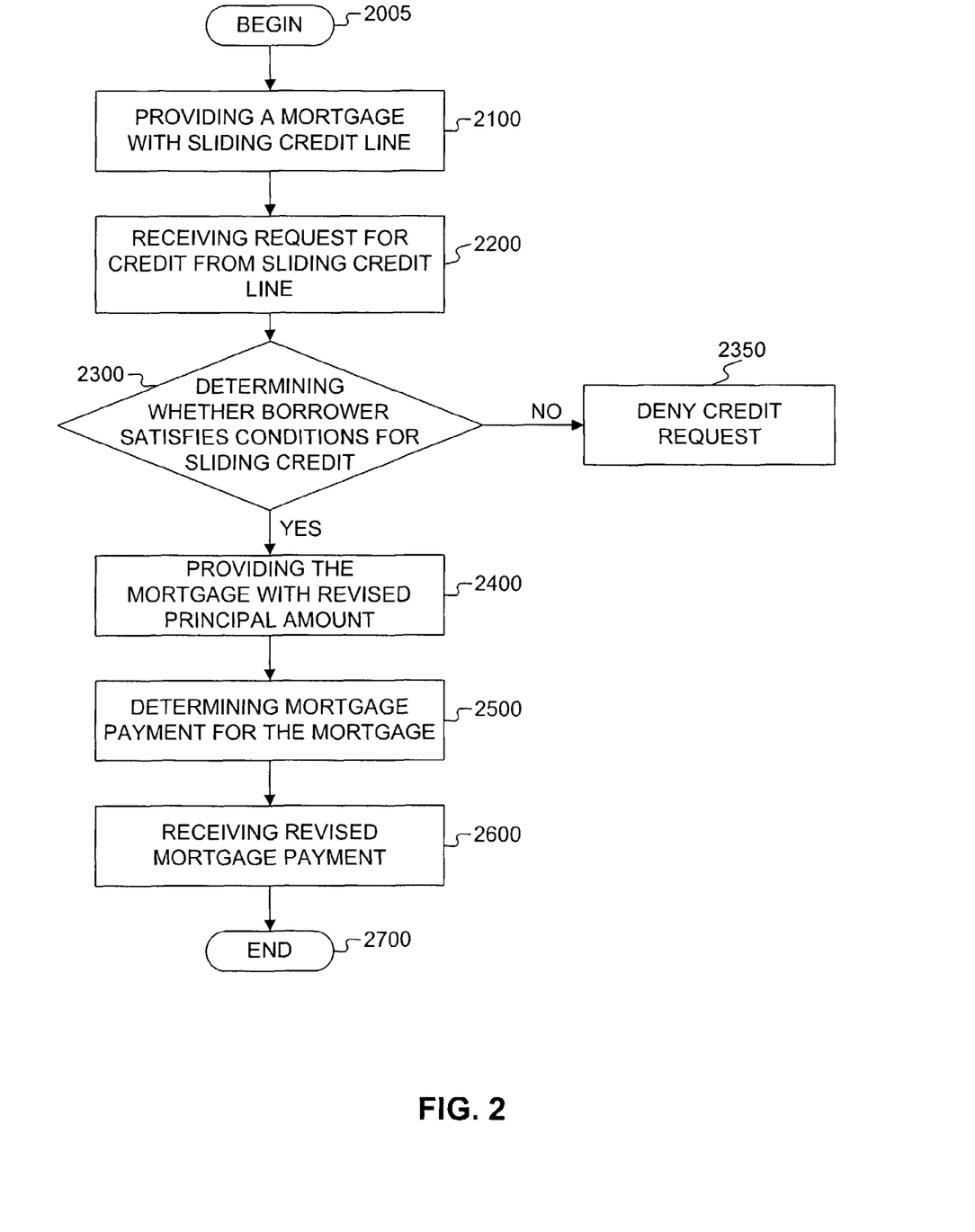
FIG. 2 is an exemplary flowchart for providing a mortgage in accordance with systems and methods consistent with the present invention.

FIG. 2 is an exemplary flowchart depicting steps for providing the mortgage with a primary credit line (e.g., an initial loan) and a sliding credit line consistent with one embodiment of the present invention. Referring to FIGS. 1 and 2, the lender 1500 may provide a mortgage to a borrower 1600 that includes a sliding credit line, which may be borrowed against during the term of the mortgage (step 2100). When the borrower requests credit from the sliding credit line (step 2200), the lender may determine whether the borrower satisfies the conditions for borrowing against the sliding credit line (step 2300). If the borrower does not satisfy the conditions for accessing the sliding credit line, the lender 1500 denies the borrower's 1600 request to access the sliding credit line (step 2350). Of course, the borrower must still make payments on the outstanding mortgage. If the borrower does satisfy the conditions, the lender revises the principal amount associated with the borrower's mortgage (step 2400). The lender also determines a revised mortgage payment that includes the original principal amount from the primary credit line and the new amount borrowed from the sliding credit line (step 2500). The borrower 1600 then pays the revised mortgage payment (step 2600). The borrower may also receive any funds from the sliding credit line.

In one embodiment, after mortgage closing (e.g., when the mortgage is provided to the borrower in step 2100), the lender may record a single first lien for the primary credit line and the sliding credit line—even though the borrower may decide not to borrow from the sliding credit line.

In one exemplary embodiment, the lender specifies two conditions for accessing the sliding credit line. The first condition requires a maximum loan-to-value ratio (including any amount requested from the sliding credit line) that does not exceed 1.2. The second condition requires a satisfactory credit history (e.g., no late payments, delinquencies, and/or a FICO™ Score greater than 550). In this embodiment, the borrower would need to satisfy both conditions to borrow from the sliding credit line (step 2300).

Although two conditions are described herein with respect to step 2300, this is only exemplary and should in no way be viewed as limiting since other conditions may be used instead. For example, a borrower may be preapproved to receive funds from the sliding credit line. When that is the case, the condition may only include receiving the request.

Figure 3:
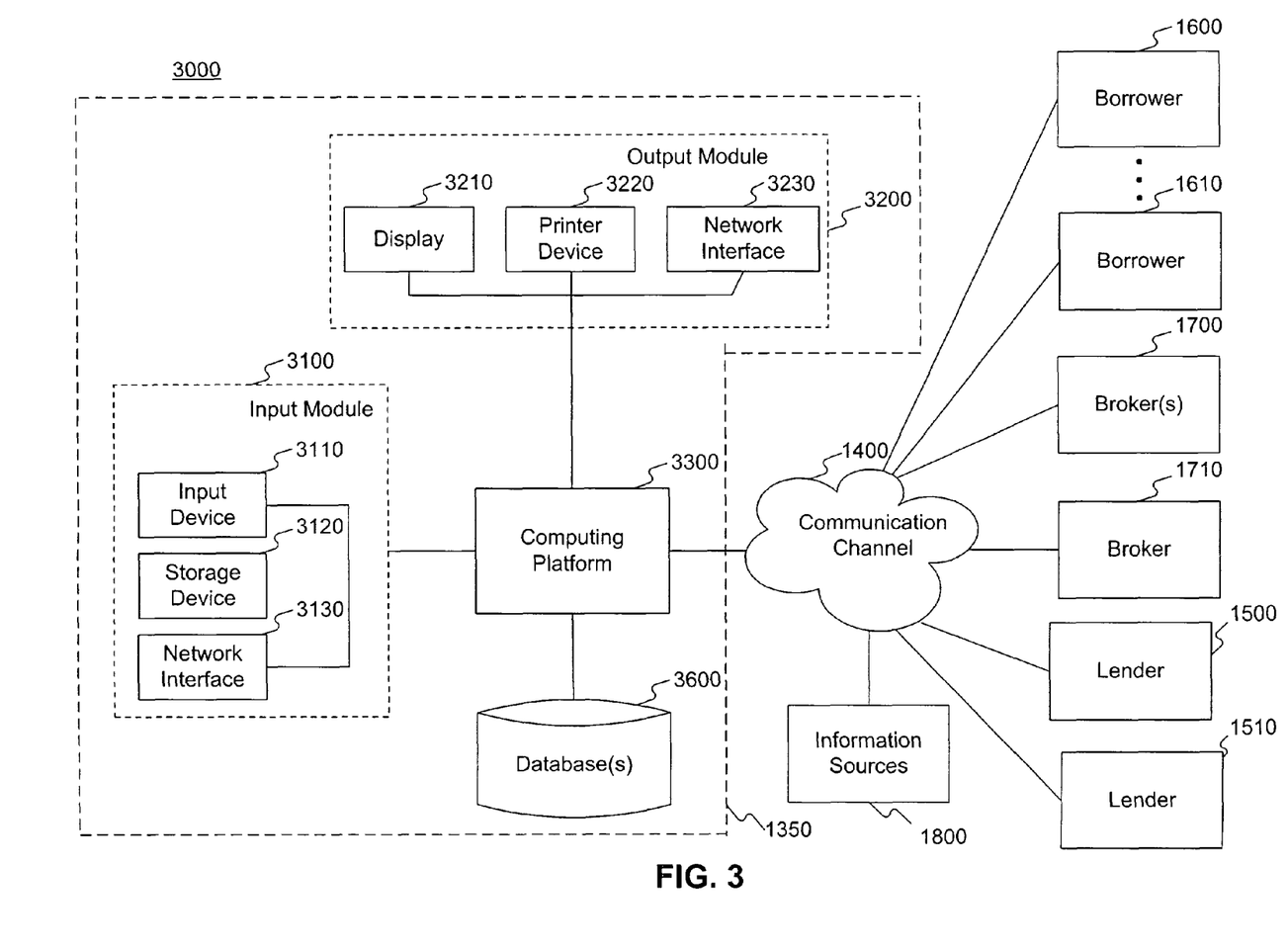
FIG. 3 illustrates another exemplary system environment in accordance with systems and methods consistent with the present invention.

FIG. 3 illustrates another exemplary system environment 3000 consistent with one embodiment of the present invention. As illustrated in FIG. 3, the system 3000 includes a processor 1350, lenders 1500, 1510, borrowers 1600, 1610, brokers 1700, 1710, information sources 1800, and a communication channel 1400. The processor 1350 may also include an input module 3100, an output module 3200, a computing platform 3300, and one or more databases 3600. The lenders 1500, 1510, brokers 1700, 1710, and borrowers 1600, 1610 may also include a computing platform 3300, input module 3100, and/or output module 3200.

In one embodiment consistent with FIG. 3, the computing platform 3300 may include a data processor such as a PC, UNIX server, or mainframe computer for performing various functions and operations. Computing platform 3300 may be implemented, for example, by a general purpose computer or data processor selectively activated or reconfigured by a stored computer program, or may be a specially constructed computing platform for carrying-out the features and operations disclosed herein. Moreover, computing platform 3300 may be implemented or provided with a wide variety of components or systems including, for example, one or more of the following: one or more central processing units, a co-processor, memory, registers, and other data processing devices and subsystems.

Communication channel 1400 may include, alone or in any suitable combination a telephony-based network, a local area network (LAN), a wide area network (WAN), a dedicated intranet, the Internet, a wireless network, or a bus. Further, any suitable combination of wired and wireless components and systems may be incorporated into the communication channel 1400. Although the computing platform 3300 may connect to the lenders 1500, 1510 through the communication channel 1400, computing platform 3300 may connect directly to the lenders 1500, 1510.

Computing platform 3300 also communicates with input module 3100 and/or output module 3200 using connections or communication links, as illustrated in FIG. 3. Alternatively, communication between computing platform 3300 and input module 3100 (or output module 3200) may be achieved using a network (not shown) similar to that described above for the communication channel 1400. A skilled artisan would recognize that computing platform 3300 may be located in the same location or at a geographical separate location from input module 3100 or output module 3200 by using dedicated communication links or a network.

Input module 3100 may be implemented with a wide variety of devices to receive and/or provide information. Referring to FIG. 3, input module 3100 may include an input device 3110, a storage device 3120, and a network interface 3130. Input device 3110 may also include a keyboard, a mouse, a disk drive, a telephone, or any other suitable input device for receiving and/or providing information to computing platform 3300. Although FIG. 3 only illustrates a single input module 3100, a plurality of input modules 3100 may also be used.

Storage device 3120 may be implemented with a wide variety of systems, subsystems, and/or devices for providing storage (or memory) including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage.

Network interface 3130 may facilitate data exchange between the communication channel 1400 and computing platform 3300 and may facilitate data exchange between the input module 3100 and the computing platform 3300. In one embodiment, network interface 3130 may permit a connection to at least one or more of the following networks: an Ethernet network, an Internet protocol network, a telephone network, a radio network, a cellular network, or any other network capable of being connected to input module 3100.

Output module 3200 may include a display 3210, a printer 3220, and a network interface 3230. The output from computing platform 3300 may be viewed through display 3210 (e.g., a cathode ray tube or liquid crystal display) and printer device 3220. Although FIG. 3 only illustrates a single output module 3200, a plurality of spatially separated output modules 3200 may be used instead.

Network interface 3230 may facilitate data exchanges between the output module 3200 and the computing platform 3300 and between the computing platform 3300 and the communication channel 1400. In one embodiment, the network interface 3230 may be similar to the network interface 3130 described above.

The database 3600 may store information received from the lenders, borrowers, and/or information sources. For example, the database 3600 may store one or more of the following: mortgage application information, credit information (e.g., credit history, outstanding liabilities, and/or credit scores), asset information, property appraisal information, loan (or mortgage) payment history, and income information. The database 3600 may also store information for one or more borrowers. Although the database 3600 is shown in FIG. 3 as being located with the computing platform 3300, a skilled artisan would recognize that the database(s) may be located anywhere (and in multiple locations) and connected to the computing platform via direct links or networks. Similarly, although the information sources 1800 are shown in FIG. 3 as being located separate from the computing platform 3300, a skilled artisan would recognize that the information sources may be located anywhere (and in multiple locations).

Figure 4:
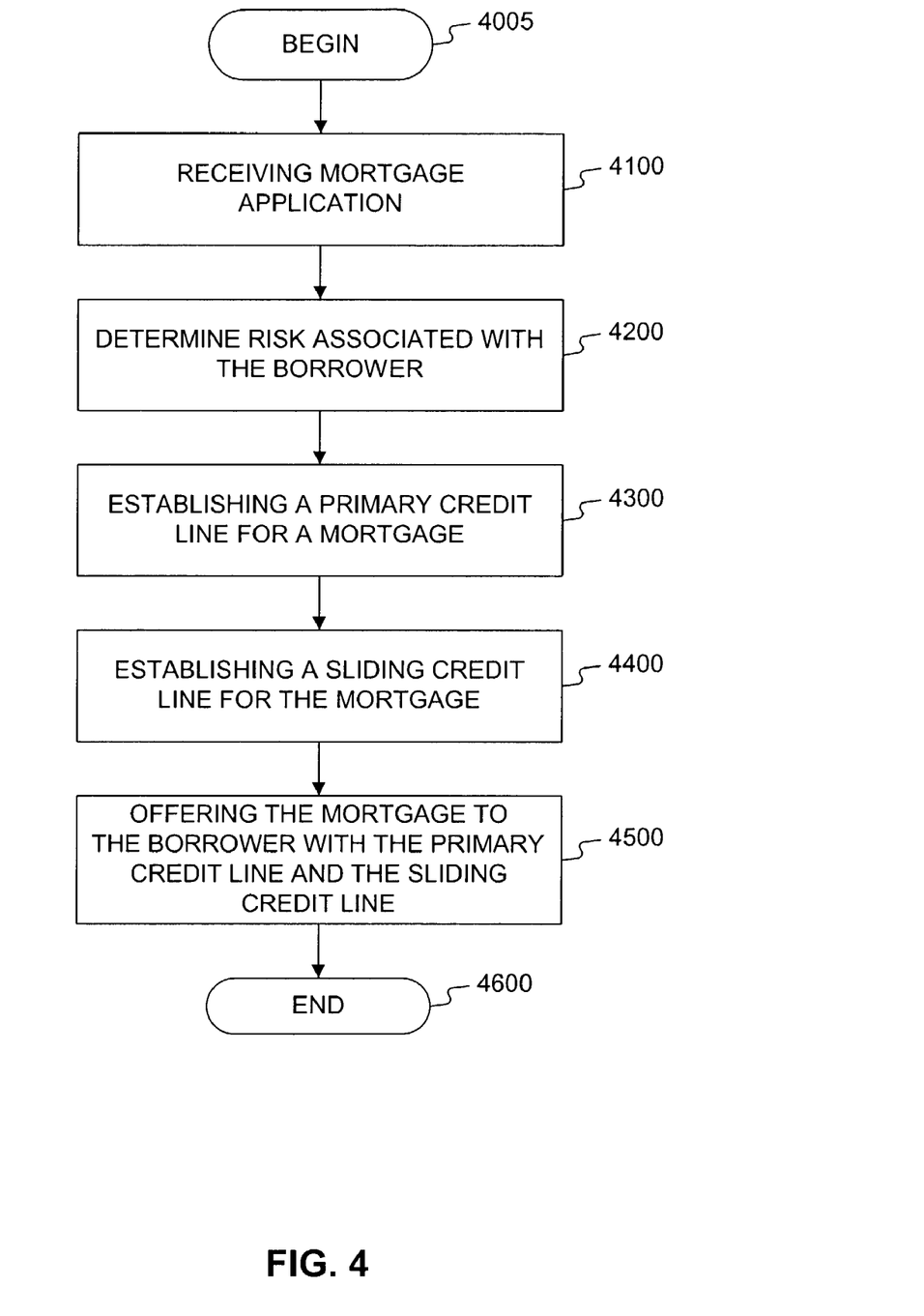
FIG. 4 is another exemplary flowchart for providing (or offering) a mortgage in accordance with systems and methods consistent with the present invention.

FIG. 4 shows another exemplary flowchart with steps for providing the mortgage with a primary credit line and a sliding credit line consistent with an embodiment of the present invention. Referring to FIG. 4, the computing platform begins when it receives a mortgage application (step 4100). The computing platform 3300 may then determine a risk of nonpayment associated with the borrower based on the mortgage application including the borrower's credit information (step 4200); establish a primary credit line and a sliding credit line based on the risk of nonpayment associated with the borrower (steps 4300-4400); and end by providing the mortgage with the primary and sliding credit lines to the borrower, such that a single first lien may serve as security for the primary and sliding credit lines (steps 4500-4600).

The borrower 1500 may complete the mortgage application, which is received by the computing platform 3300 (step 4100). In one exemplary embodiment, the borrower 1500 completes the mortgage application through the Internet by entering information requested on the mortgage loan application. For example, the mortgage loan application may include one or more of the following information: borrower's name and address, address of the mortgaged property, income, employer, assets, and liabilities. The completed mortgage application is then received by the computing platform 3300 associated with the lender 1500.

The computing platform 3300 may also receive additional information from database 3600 or information sources 1800 additional information for the borrower, such as credit information (e.g., credit history, outstanding liabilities, and/or credit scores), asset information, loan (or mortgage) payment history, income information, and property appraisal information. As defined herein, the mortgage application may include the additional information received from the database 3600 and/or information sources 1800. In one embodiment, the received information may include credit information from information sources that provide credit history, such as First American, Equifax, TransUnion, or Experian. The additional information may also include asset information, such as a real estate appraisal report (or other estimates of value) provided by DataQuick and IDM. Moreover, the property appraisal may be based on an in-person appraisal (e.g., an inspection) or, alternatively, an automated appraisal (or estimate of value) using an automated valuation model (AVM), such as Home Value Explorer$^{SM}$ (HVE).

The computing platform 3300 may then analyze the mortgage application including the borrower's credit information to determine a level of risk associated with the borrower (step 4200). The level of risk associated with the borrower and the mortgage represents a likelihood that the borrower will fail to make timely payments and possibly default on the mortgage or that the property will decline in value. The risk of nonpayment may include, inter alia, the risk of late payment and the risk of default. This risk of nonpayment varies according to various factors. For example, a borrower with a poor credit history, such as late payments and delinquencies, represents a higher level of nonpayment risk when compared to a borrower without a history of late payments and delinquencies (i.e., a satisfactory credit history). Similarly, a borrower with excessive debt, insufficient income, or insufficient equity in the mortgaged property (e.g., a loan-to-value ratio equal to or greater than one) represents a higher level of nonpayment risk when compared to a borrower with little debt, sufficient income, and sufficient equity in the mortgaged property. Accordingly, the computing platform 3300 may determine the level of nonpayment risk associated with the borrower before determining the credit lines for the borrower's mortgage.

In one embodiment, the computing platform 3300 may receive a property appraisal when determining the risk associated with the borrower. The value of the mortgaged property, which is estimated by an appraisal, enables the computing platform 3300 to determine the loan-to-value ratio of the mortgage. For example, a property valued at $100,000 with a primary credit line of $80,000 and a sliding credit line of $20,000 would have a loan-to-value ratio of 0.8 (or 80%). If the sliding credit line is included, the loan-to-value is 1.0 (100%).

Although the entire sliding credit line may be included in the loan-to-value ratio determination, the computing platform 3300 may alternatively compute the loan-to-value only on amounts actually borrowed. Returning to the above example, when the borrower makes a request to borrow $10,000 from the sliding credit line of $20,000, the total loan amount corresponds to $90,000, i.e., the sum of $80,000 (primary credit line) and $10,000 (sliding credit line). The property value may be equivalent to the original appraisal of $100,000. When that is the case, the loan-to-value ratio is 0.9 ($90,000/$100,000). Alternatively, the computing platform 3300 may receive a reappraisal (or new appraisal) for the property when the sliding credit line is invoked. For example, the property may have changed value, such as an increase to $150,000. When that is the case, the loan-to-value ratio corresponds to 0.6 ($90,000/$150,000).

In one embodiment, a loan-to-value ratio of about 0.8 or less can contribute to a lower risk (or likelihood) of nonpayment. Although loan-to-value is described in this example as a factor in determining the borrower's risk of nonpayment, any other information may also be used either alone or in combination with the loan-to-value ratio.

Based on the determined risk of step 4200, the computing platform 3300 may then establish for the borrower a primary credit line and a sliding credit line (steps 4300-4400). The computing platform 3300 may establish the primary credit line so that it is sufficient to serve as the initial loan for the purchase of the property. For example, the primary credit line provides 80% of the purchase price, and the borrower makes a down payment for the remaining 20%. On the other hand, the computing platform 3300 may establish the sliding credit line as maximum amount from which the borrower 1500 may borrow. As noted above, the sliding credit line may include one or more conditions that specify the terms under which the borrower may request and receive credit from the sliding credit line.

In one embodiment, the mortgage application includes, among other things, a loan amount requested by the borrower. The mortgage application and/or the credit information contained in a credit report may also include the number of open accounts in the credit report, account balances in revolving credit lines, account limits in revolving credit lines, other account balances, mortgage balances, mortgage payments, tax payments, 30, 60, or 90 day delinquencies, foreclosures, and other information reported by credit repositories. Moreover, the mortgage application may include (or be accompanied by) an appraisal of the property and verification of income and borrower assets. For example, based on information included in the mortgage application and credit report, the computing platform 3300 may then determine the borrower's risk of nonpayment and establish the borrower's primary credit line (which is preferably the loan amount requested by the borrower in the mortgage application) and sliding credit line.

The lender 1500, via the computer platform 3300 and communication channel 1400, may then provide the mortgage to the borrower with the primary and sliding credit lines 1600 (step 4500). Moreover, the primary and sliding credit lines may each include respective interest rates, either fixed or variable. The borrower 1500 then receives the amount represented by the primary credit line when the mortgage closes. The borrower 1500 also receives the sliding credit line when, as noted above, certain conditions are satisfied. Although the sliding credit line may be accessed by the borrower after closing, the borrower 1500 may also request and receive funds from the sliding credit line as part of the closing.

Returning to the previous example above where the primary credit line is $80,000 and the sliding credit line is $20,000, the borrower receives $80,000 at mortgage closing which can be applied towards the purchase of the mortgaged property. The lender also records a lien against the property of $100,000 (i.e., the primary credit line and the sliding credit line). Meanwhile, the borrower may request additional credit up to $20,000 over the term of the mortgage. For example, the borrower may request $20,000 from the sliding credit line to help make the down payment at closing, improve the mortgaged property, or payoff a debt. In this example, the mortgage includes a condition that limits the borrower's sliding credit line to a maximum loan-to-value ratio to 1.0 (based on the primary credit line, the sliding credit line, and the property appraisal). However, any other loan-to-value ratio may be used instead, such as 0.8 or 1.5, for determining the lifetime borrowing amount.

Figure 5:
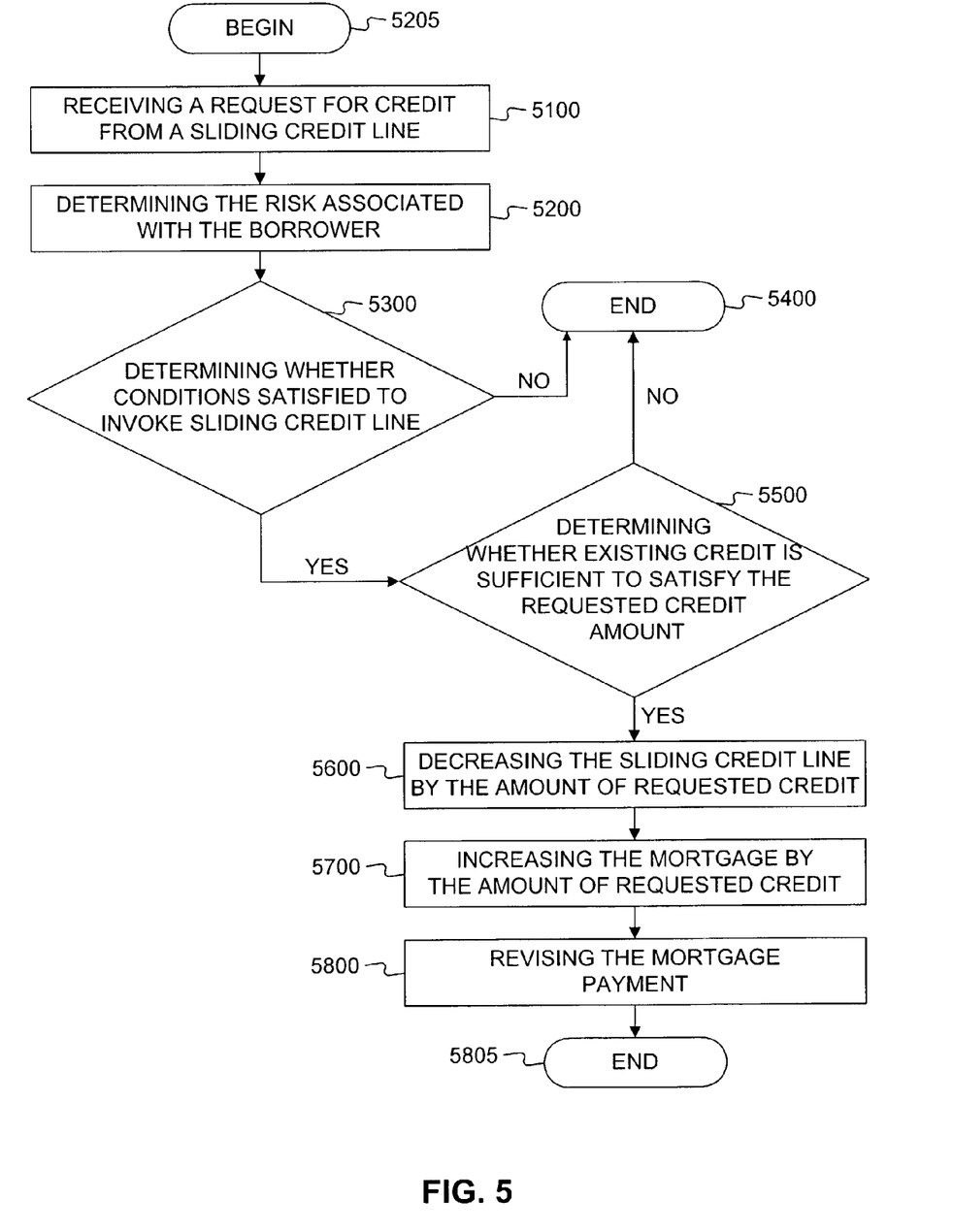
FIG. 5 is an exemplary flowchart for invoking the sliding credit line associated with the mortgage in accordance with systems and methods consistent with the present invention.

FIG. 5 shows an exemplary flowchart with steps for requesting and then providing credit from the sliding credit line. Referring to FIGS. 3 and 5, the computing platform 3300 may begin when it receives a request for credit on a mortgage with a sliding credit line (steps 5205-5100). The computing platform 3300 may then determine the risk of nonpayment associated with the borrower (step 5200); and determine whether the borrower satisfies conditions under which the borrower can access the sliding credit line (step 5300). If the borrower fails to satisfy the conditions, the computing platform 5400 may reject the request for sliding credit (step 5400). If the borrower satisfies the conditions, the computing platform 3300 may determine the amount available in the sliding credit line (step 5500). If the sliding credit line includes a sufficient amount to cover the request for credit, the computing platform 3300 may decrease the sliding credit line by the requested amount; increase the mortgage amount by the amount requested by the borrower; and end by revising outstanding principal (also referred to herein as debt) associated with the mortgage (steps 5600-5805). If the available funds in the sliding credit line are insufficient to cover the request, the computing platform 3300 may reject the request or, alternatively, notify the borrower that the sliding credit line (step 5400) cannot cover the request.

To borrow from the sliding credit line, the computing platform 3300 receives a request from the borrower 1500. In one embodiment, the computing platform 3300 receives the request from the borrower 1500 over the communication channel 1400, such as the Internet. The received request may also indicate the amount requested from the sliding credit line.

When the request is received, the computing platform 3300 determines the nonpayment risk associated with permitting the borrower to access the sliding credit line (step 5200). This nonpayment risk includes the likelihood that the borrower defaults on the mortgage represented by the added debt of the sliding credit line. In one embodiment, the borrower's FICO™ Score is used to determine the risk of nonpayment. For example, a borrower with a FICO™ Score of less than 500 may represent a significant risk of nonpayment. The original primary credit line and the added sliding credit line are processed to determine the risk as in step 4200.

To determine whether to allow access to the sliding credit line (step 5300), the computing platform 3300 may grant access based on the determined risk of step 5200. Moreover, the computing platform 3300 may determine whether to allow access by considering certain conditions under which the borrower may access the sliding credit line. For example, the conditions, which may be defined in the mortgage, may include one or more of the following: a satisfactory credit history (e.g., no delinquencies, late payments, a satisfactory credit score, such as the FICO® Score); a maximum installment debt-to-income ratio; a recent appraisal report for the mortgaged property; a maximum loan-to-value ratio on the mortgaged property; how often the sliding credit line may be accessed; when the sliding credit line may be accessed; how the sliding credit line may be accessed; and an applicable interest rate (e.g., prime plus 2%). If the conditions are satisfied (yes at step 5300), the lender 1500 may conclude that the risk associated with permitting access to the sliding credit line is acceptable.

If the conditions are satisfied, the computing platform 3300 may also determine whether the existing sliding credit line is sufficient to satisfy the request (step 5500). For example, if the sliding credit line is $5000 and the borrower requests $10,000, the computing platform 3300 should deny the request to access the sliding credit line because the sliding credit line is insufficient to satisfy the request (no at step 5500). On the other hand, if the amount of sliding credit is larger (or equal to) the amount requested, the computing platform 3300 approves the request and decreases the amount of available sliding credit by the requested amount (step 5600). For example, if the sliding credit line is $30,000 and the borrower requests $10,000, the sliding credit line is sufficient. As a result, the computing platform 3300 approves the request and decreases the available amount of sliding credit by $10,000. In this example, the borrower 1500 still has $20,000 of sliding credit that is available for possible future use.

In one embodiment, the computing platform may, as part of step 5500, request an appraisal report from a traditional in-person appraiser (or inspection) or an AVM. The computing platform 3300 may then determine whether to adjust the sliding credit line based on the appraisal. For example, if the appraisal indicates an increase in value for the mortgaged property, the sliding credit line may be increased. Similarly, if the value, loan-to-value, or other factors, indicates a decrease, the sliding credit line may be reduced.

The computing platform 3300 also increases the principal owed on the mortgage by the amount requested (step 5700). For example, if the outstanding principal is $100,000 and the borrower requests and is approved for $20,000 in sliding credit, the borrower's outstanding mortgage principal increases to $120,000. The computing platform 3300 then revises the mortgage payment based on the revised principal of 120,000 (step 5800).

Figure 6:
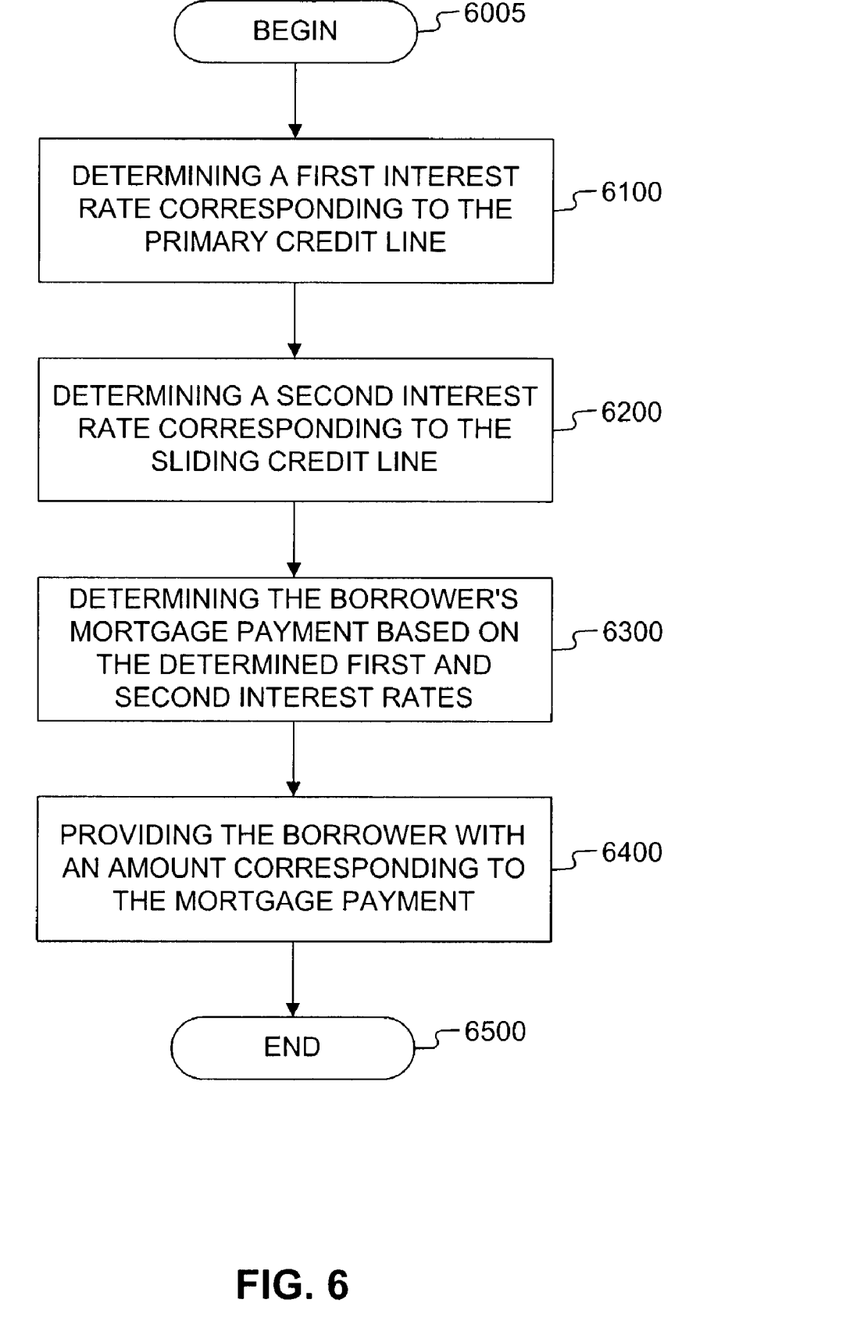
FIG. 6 is an exemplary flowchart for revising the payment(s) of the mortgage.

FIG. 6 shows an exemplary flowchart with steps for providing the borrower with a mortgage payment based on the primary credit line and any amounts requested from the sliding credit line. Referring to FIG. 6, the computing platform 3300 may determine—and if necessary store in database 3600, a first interest rate corresponding to the primary (or original) outstanding principal amount of the mortgage (step 6100). For example, the first interest rate may correspond to the prevailing mortgage rate at mortgage closing (see, e.g., FIG. 4, step 4500).

When the borrower requests credit from the sliding credit line, the computing platform 3300 may determine—and if necessary store in database 3600, a second interest rate corresponding to the amount of credit requested from the sliding credit line (step 6200). In one embodiment, the second interest rate may be fixed or variable. If the second interest rate is variable, it may be based on the prime interest rate plus a fixed percentage (e.g., prime interest rate plus 1%). Although this exemplary embodiment describes a second interest rate, multiple interest rates may be stored in database 3600. Each of the interest rates may correspond to a separate amount borrowed from the sliding credit line.

To determine the borrower's mortgage payment, the computing platform 3300 calculates the principal and interest due for each piece of the mortgage. That is, the computing platform 3300 computes the payment due based on the primary (or original) outstanding principal using the first interest rate and computes the payment due based on the amount requested from the sliding credit line using the second interest rate. In this example, the mortgage payment essentially consists of (1) a first mortgage payment calculated based on the primary principal and interest and (2) a second mortgage payment calculated based on the amount drawn from the sliding credit line and its corresponding interest rate. Although in this embodiment the computing platform 3300 separately determines the first and second mortgage payments, the borrower simply makes a single mortgage payment consisting of the sum of the first and second mortgage payments. Of course, the borrower's total mortgage payment may also include taxes and insurance. In one embodiment, a mortgage servicer may provide a bill reflecting the borrower's mortgage payment, i.e., the sum of the principal and interest payments on the first and second mortgage payments and any applicable taxes and/or insurance. When that is the case, the borrower makes the mortgage payment to the mortgage servicer. The mortgage servicer then pays any received payments to the holder of the mortgage note.

Figure 7:
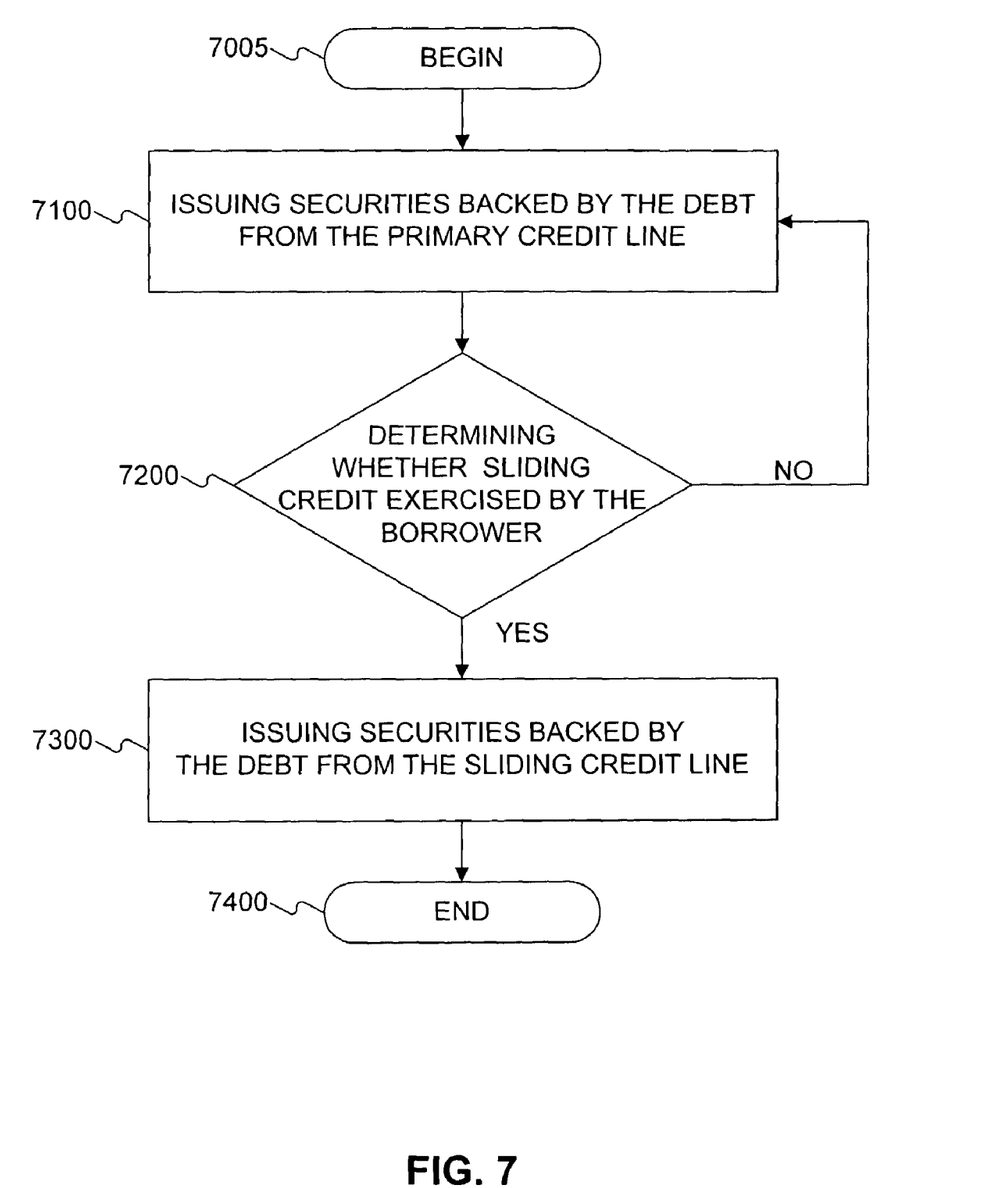
FIG. 7 is an exemplary flowchart for issuing securities in accordance with systems and methods consistent with the present invention.

FIG. 7 shows an exemplary flowchart with steps for issuing securities backed by mortgages with the sliding credit line. Referring to FIG. 7, the lender 1500 may issue (or sell) securities backed by the outstanding debt associated with the primary credit line (step 7100). The lender 1500 may also determine whether the sliding credit line is accessed by the borrower (step 7200). If so, the lender 1500 may issue additional securities backed by the debt corresponding to the sliding credit line (step 7300).

In one exemplary embodiment, the lender 1500 may issue securities backed by the debt of the primary credit line (step 7100). In one embodiment, computing platform 3300 may build (store in database 3600, and/or send via communication channel 1400) a data structure including one or more of the securities to be sold to investors. Investors may then purchase securities backed by the primary credit line debt. The lender 1500 may hold the primary credit line debt in a mortgage pool, which may also be stored and/or sent as a data structure. As principal and interest payments are made, the purchasers of the mortgage-backed securities are paid dividends, and the underlying debt in the mortgage pool is also serviced. Mortgage backed securities are described in detail by E. Baldwin and S. Stotts in the book titled *Mortgage Backed Securities: A Reference Guide For Lenders and Issuers,* 1990, which is incorporated herein by reference in its entirety.

The sliding credit line, which represents an unexercised future debt, may also be held (or pooled) by the lender 1500 until the borrower draws from the sliding credit line. In one embodiment, the held debt may also be stored as a data structure in database 3600 (or storage 3120) and/or sent via communication channel 1400. When the borrower draws (or borrows) from the sliding credit line, the computing platform 3300 associated with the lender 1500 receives an indication that the sliding credit line has been accessed (step 7200). When that occurs, lender 1500 may pool (or hold) the debt of the sliding credit line debt separately from the debt associated with the primary credit line.

Moreover, the sliding credit line debt may be issued as securities, which are separate from the securities issued on the primary credit debt (step 7300). Alternatively, the lender 1500 may decide to keep the sliding credit line debt in a pool, and invest the income paid by the borrower. In either case, the borrower's mortgage payment is apportioned into at least two: a piece for the primary credit line debt and a piece for the sliding credit line debt. Each piece is applied to its respective pool such that the payments are made to satisfy mortgage notes and/or dividend payments to investors.

Although the above description of FIG. 7 refers to the lender 1500, a skilled artisan would recognize that a lender's representative, such as a broker or trustee, may be used instead. For example, a trustee may be responsible for pools of debt representing the sliding credit line(s) and/or the primary credit line(s). When the sliding credit line debt is issued as a security, the mortgage servicer would make principal and interest payments directly to the trustee. The trustee then pays any investor dividends and pays the mortgage note.

Although the above embodiment describes separate treatment for the primary and sliding credit lines, a skilled artisan would also recognize that the lender 1500 may instead pool and sell the primary credit line debt and the sliding credit line as part of a single mortgage-backed securities issuance.

In one embodiment, the computing platform 3300 may interface with, or be embedded in, one or more systems (not shown), that provide financial information, credit information, or real estate information. Such systems include, for example, systems that are used to originate mortgages.

Furthermore, although the embodiments above refer to processing information related to mortgages in its broadest sense systems and methods consistent with the present invention may provide any type of loan, credit instrument, or line of credit with a primary part and a sliding part.

The systems disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

Turning to the nomenclature of the specification, the detailed description above is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes herein, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files, etc. However, these and similar terms should be associated with appropriate physical quantities for computer operations. These terms are merely conventional labels applied to physical quantities that exist within and during computer operation.

What is claimed is:

1. A computer-implemented method of creating a mortgage to assist a borrower and to create greater risk certainty for an investor, said method comprising:
    obtaining, from an electronic database, data representing credit information of the borrower;
    calculating, using a computer data processor, a level of risk associated with the borrower based on the data representing credit information;
    establishing, using the computer data processor, a single sliding equity mortgage based on the determined level of risk associated with the borrower, the single sliding equity mortgage being established with a maximum amount of debt at a time of issuing the single sliding equity mortgage and being the only mortgage issued for a property;
    distributing, upon closing the single sliding equity mortgage, an initial amount of debt that is less than the maximum amount of debt;
    calculating, using the computer data processor, a second amount of debt for the single sliding equity mortgage based on the determined level of risk associated with the borrower, where a sum of the second amount of debt and the initial amount of debt does not exceed the maximum amount of debt; and
    modifying, using the computer data processor, the single sliding equity mortgage balance to indicate that a total amount of debt due on the single sliding equity mortgage includes the sum of the second amount of debt and the initial amount of debt, after issuing the single sliding equity mortgage and without initiating a new mortgage to secure the second amount, wherein
    the maximum amount of debt associated with the single sliding equity mortgage is dynamic and changes dynamically after the closing based on appreciation or depreciation of an underlying asset associated with the single sliding equity mortgage.

2. The method of claim 1, wherein calculating the level of risk further comprises:
    calculating the level of risk based on at least one of the following: asset information and value of a property.

3. The method of claim 1, wherein calculating the level of risk further comprises:
    calculating the level of risk based on income information.

4. The method of claim 1, wherein calculating the level of risk further comprises:
    calculating the level of risk based on liability information of the borrower.

5. The method of claim 1, wherein calculating the level of risk further comprises:
    calculating the level of risk based on an appraisal value of a property.

6. The method of claim 1, wherein calculating the level of risk further comprises:
    calculating the level of nonpayment risk.

7. The method of claim 1, wherein establishing the initial amount further comprises:
    establishing a first interest rate for the initial amount.

8. The method of claim 1, wherein establishing the initial amount further comprises:

establishing the initial amount as less than or equal to about 80% of a value of a property securing the single sliding equity mortgage.

9. The method of claim 1, wherein calculating the second amount further comprises:
   establishing a second interest rate for draws against the second amount.

10. The method of claim 1, wherein calculating the second amount further comprises:
    establishing one or more conditions for the second amount, the one or more conditions granting or denying access to the second amount.

11. The method of claim 10, wherein establishing one or more conditions further comprises:
    defining said one or more conditions to include at least one of the following: a satisfactory credit history, a maximum loan-to-value ratio, an interest rate, a time for accessing the second amount, a frequency of accessing the second amount, and a reappraisal of the mortgaged property.

12. The method of claim 11, further comprising defining the satisfactory credit history as including no late payments.

13. The method of claim 1, further comprising recording the single sliding equity mortgage as the sum of the initial amount and the second amount.

14. The method of claim 1, further comprising:
    establishing the second amount as available credit from the single sliding equity mortgage.

15. The method of claim 1, wherein calculating the second amount further comprises:
    establishing the maximum as an amount greater than a value representative of a property subject to the single sliding equity mortgage.

16. The method of claim 15 further comprising:
    determining the value as an estimate representative of the value after the mortgage closes.

17. The method of claim 1 further comprising:
    defining the initial amount as a primary credit line and the second amount as an amount of available equity secured by the single sliding equity mortgage.

18. The method of claim 1, wherein said method further comprises:
    selling the single sliding equity mortgage to the investor.

19. The method of claim 1, wherein said method further comprises issuing a security backed in part by the single sliding equity mortgage.

20. A system for creating a mortgage to assist a borrower and to create greater risk certainty for an investor, said system comprising:
    a processor; and
    a memory, wherein the processor and the memory:
    determine a level of risk associated with the borrower based on credit information of the borrower;
    establish a single sliding equity mortgage based on the determined level of risk associated with the borrower, the single sliding equity mortgage being established with a maximum amount of debt at a time of issuing the single sliding equity mortgage and being the only mortgage issued for a property;
    distribute, upon closing the single sliding equity mortgage, an initial amount of debt that is less than the maximum amount of debt;
    establish a second amount of debt for the single sliding equity mortgage based on the determined level of risk associated with the borrower, where a sum of the second amount and the initial amount is set as the maximum amount of debt; and
    modify the single sliding equity mortgage balance to indicate that a total amount of debt due on the single sliding equity mortgage includes the sum of the second amount of debt and the initial amount of debt, after issuing the single sliding equity mortgage and without initiating a new mortgage to secure the second amount, wherein
    the maximum amount of debt associated with the single sliding equity mortgage is dynamic and changes dynamically after the closing based on appreciation or depreciation of an underlying asset associated with the single sliding equity mortgage.

21. A computer program product for creating a mortgage to assist a borrower and to create greater risk certainty for an investor, the computer program product comprising:
    a tangible computer readable medium including:
    code that determines a level of risk associated with the borrower based on credit information of the borrower;
    code that establishes a single sliding equity mortgage based on the determined level of risk associated with the borrower, the single sliding equity mortgage being established with a maximum amount of debt at a time of issuing the single sliding equity mortgage and being the only mortgage issued for a property;
    code that distributes, upon closing the single sliding equity mortgage, an initial amount of debt that is less than the maximum amount of debt;
    code that establishes a second amount of debt for the single sliding equity mortgage based on the determined level of risk associated with the borrower, where a sum of the second amount and the initial amount of debt does not exceed the maximum amount of debt; and
    code that modifies the single sliding equity mortgage balance to indicate that a total amount of debt due on the single sliding equity mortgage includes the sum of the second amount of debt and the initial amount of debt, after issuing the single sliding equity mortgage and without initiating a new mortgage to secure the second amount, wherein
    the maximum amount of debt associated with the single sliding equity mortgage is dynamic and changes dynamically after the closing based on appreciation or depreciation of an underlying asset associated with the single sliding equity mortgage.

\* \* \* \* \*